United States Patent [19]

Licata et al.

[11] Patent Number: 4,672,709
[45] Date of Patent: Jun. 16, 1987

[54] WINDSHIELD WIPER DRIVE

[75] Inventors: Joseph P. Licata, Dayton; David P. Kudla, Kettering, both of Ohio

[73] Assignee: General Motors Corporation, Detroit, Mich.

[21] Appl. No.: 810,736

[22] Filed: Dec. 19, 1985

[51] Int. Cl.[4] ............................................. B60S 1/24
[52] U.S. Cl. ............................ 15/250.27; 15/250.21; 15/250.34
[58] Field of Search ........... 15/250.27, 250.21, 250.34, 15/250.35, 250.3, 250.13; 318/443

[56] References Cited

U.S. PATENT DOCUMENTS 3,422,480  1/1969  Kato ................................. 15/250.21
4,431,954  2/1984  Carpenter et al. .................. 318/443

FOREIGN PATENT DOCUMENTS 75237  6/1981  Japan ................................. 15/250.35

Primary Examiner—Peter Feldman
Attorney, Agent, or Firm—Saul Schwartz

[57] ABSTRACT

A drive for a tandem windshield wiper system including a driver's side wiper blade and a passenger side wiper blade wherein the driver's primary vision area is wiped twice during each tandem stroke of the wiper blades. The drive includes a unidirectional electric motor with a crank arm, a rotatable drive plate connected to the passenger's side wiper blade, a driver's side crank arm connected to the driver's side wiper blade, a transverse drive link connected to the motor crank arm and linearly reciprocated thereby, linkage between the drive link and the drive plate operative to convert reciprocation of the drive link to angular oscillation of the drive plate and passenger side wiper blade, and a transverse operating link between the drive plate and the driver's side crank arm operative to transfer angular oscillation of the drive plate to the crank arm and driver's side wiper blade in tandem fashion.

1 Claim, 2 Drawing Figures

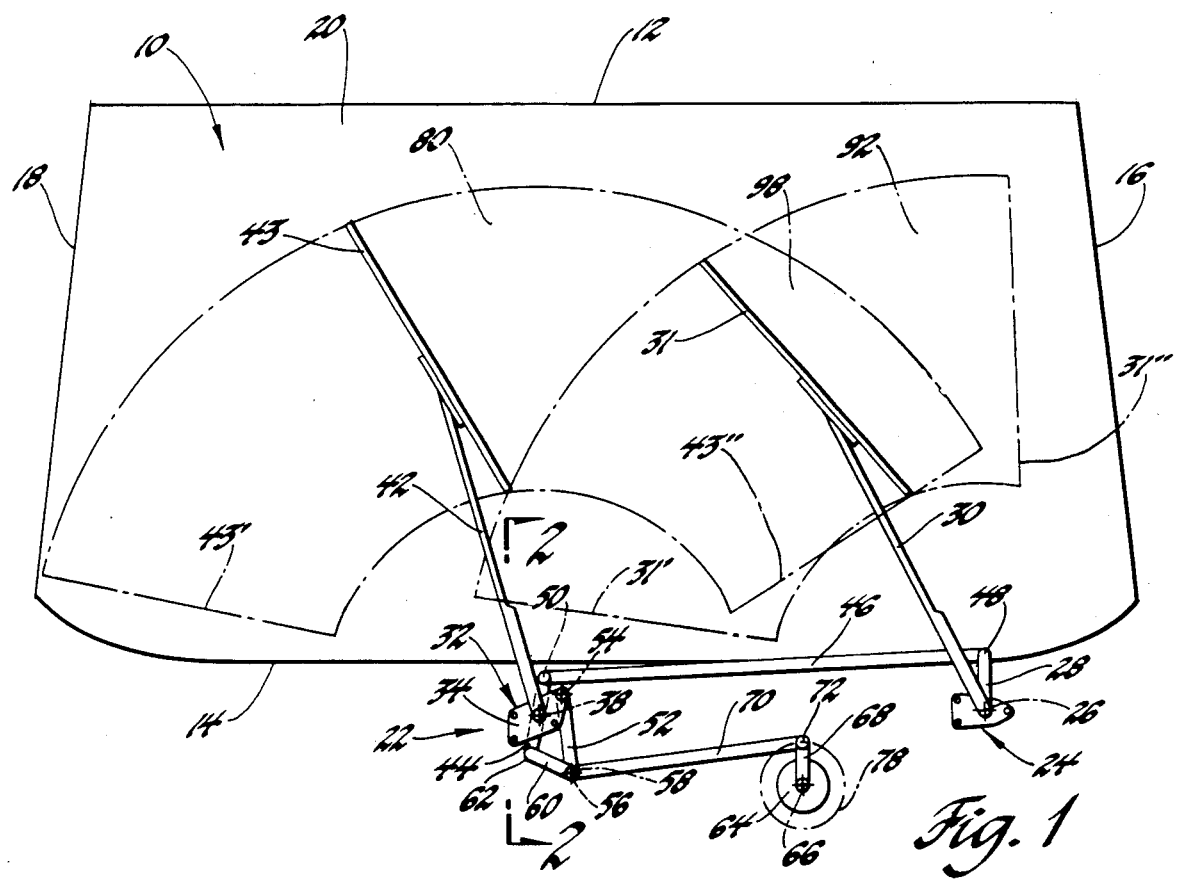
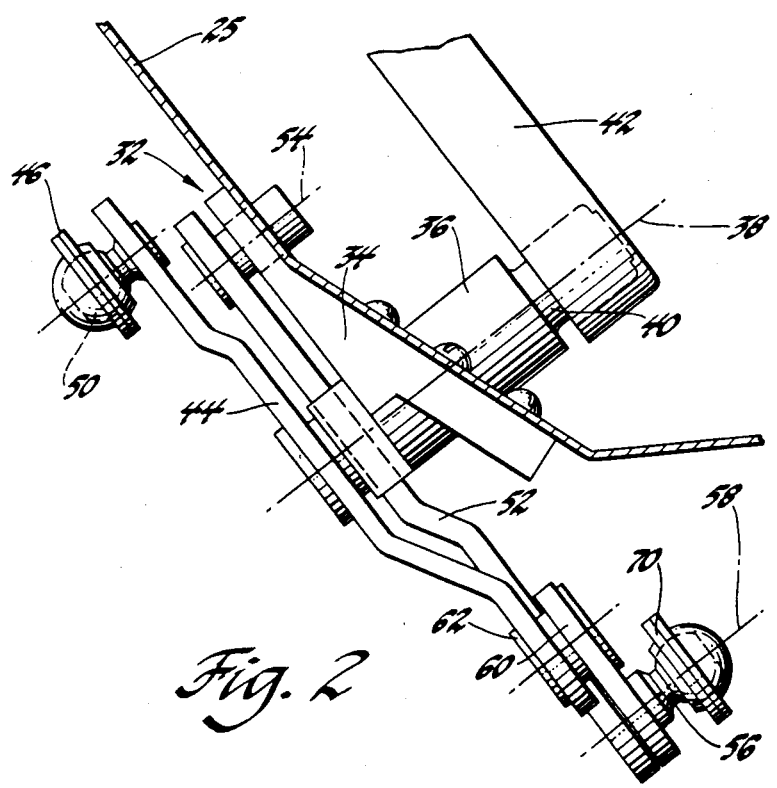

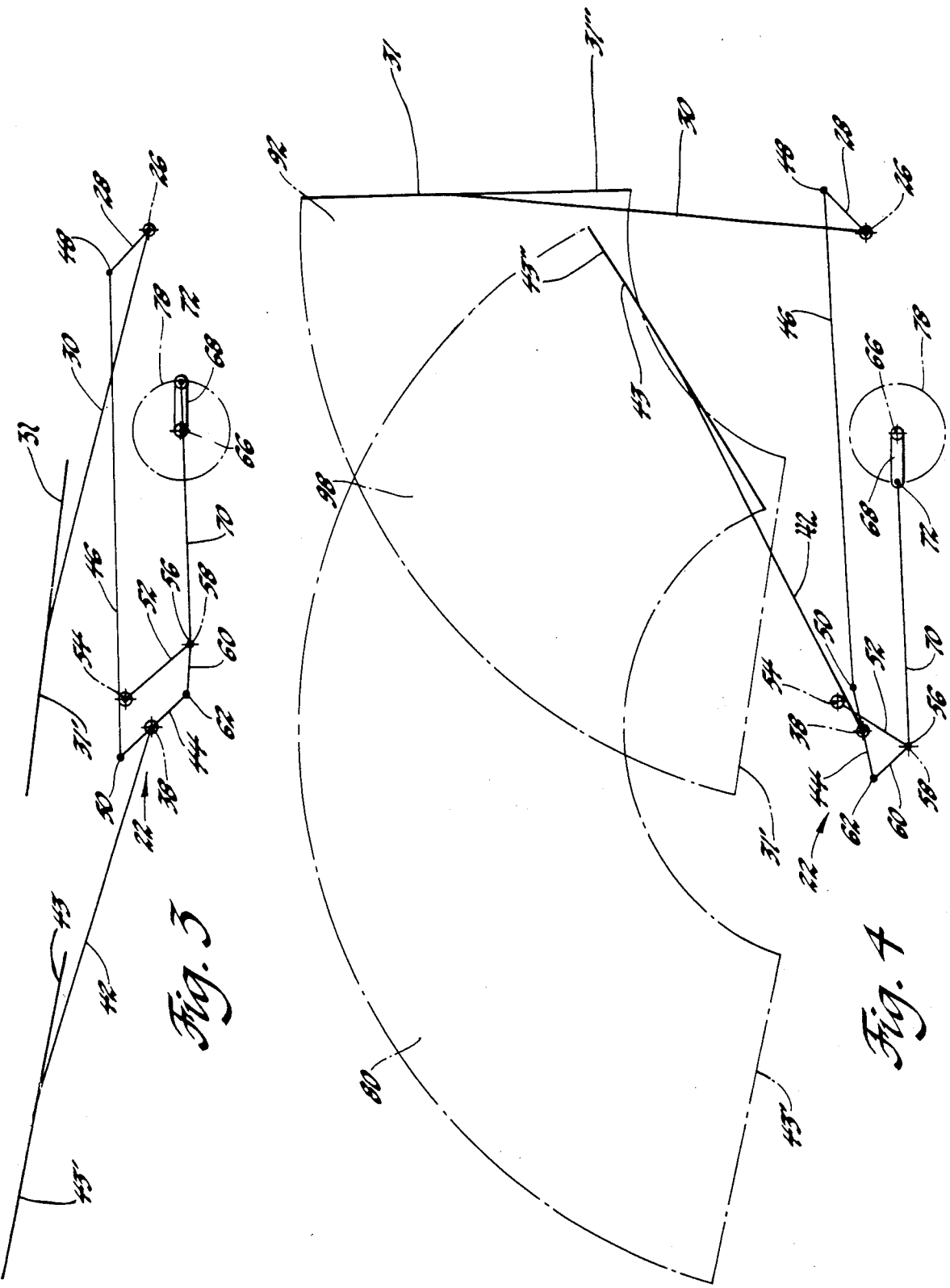

4,672,709

WINDSHIELD WIPER DRIVE

FIELD OF THE INVENTION

This invention relates generally to vehicle windshield wiper systems and, more particularly, to a drive for a tandem wiper system wherein a driver's primary vision area is double wiped.

DESCRIPTION OF THE PRIOR ART

In typical tandem windshield wiper systems, a first wiper is pivotally supported below the driver's side of the windshield and a second wiper is pivotally supported below the windshield to the passenger'side of the first wiper. The two wipers are driven in tandem fashion, i.e. in the same direction at the same time, across the windshield in separate arcs each of which has an inner limit adjacent the lower edge of the windshield. The outer limit of the arc of the first wiper is adjacent the driver's side edge of the windshield and the outer limit of the arc of the second wiper is normally just inside of the arc of the first wiper so that water wiped by the second wiper is carried off the windshield by the first wiper. In U.S. Pat. No. 4,431,954, issued Feb. 14, 1984, to Carpenter et al and assigned to the assignee of this invention, a tandem windshield wiper system is proposed wherein each of the wipers is driven by a separate, reversible electric motor. The motors are coordinated such that the first wiper on the driver's side dwells at or near its outer limit while the second wiper to the passenger's side of the first wiper continues toward an extended outer limit thereby wiping again a portion of the arc of the first wiper in front of the driver which double wiped portion forms the driver's primary vision area. A windshield wiper drive according to this invention achieves the result of the system proposed in the aforementioned patent to Carpenter et al but with only a single, unidirectional electric motor and mechanical linkage and therefore represents a novel alternative to the proposed two-motor arrangement.

SUMMARY OF THE INVENTION

Accordingly, the primary feature of this invention is that it provides a new and improved drive in a tandem windshield wiper system wherein a double wipe of a driver's primary vision area is achieved during each tandem stroke of driver's side and passenger's side windshield wipers. Other features of this invention reside in the provision in the new and improved windshield wiper drive of a crank arm on the vehicle body driven by a unidirectional electric motor, a passenger's side crank arm connected to the passenger's side wiper, a driver's side crank arm connected to the driver's side wiper, a transverse drive link connected to the motorized crank arm for reciprocation in linear strokes proportional to the length of the motorized crank arm, linkage means between the other end of the drive link and the passenger's side crank arm operative to convert the linear stroke of the drive link to an angular stroke of the passenger's side crank arm of predetermined magnitude sufficient to pivot the passenger's side wiper through an arc having an inner limit adjacent the lower edge of the windshield and an outer limit on the opposite side of the driver's primary vision area from the inner limit, and a transverse operating link between the passenger's side and driver's side crank arms operative to transfer angular movement of the former to the latter so that the driver's side wiper is pivoted through an arc having an inner limit adjacent the lower edge of the windshield and an outer limit on the opposite side of the driver's primary vision area from the inner limit. Yet another feature of this invention resides in the provision in the new and improved windshield wiper drive of predetermined angular relationships between the driver's and passenger's side crank arms and their respective wipers and between the driver's and passenger's side crank arms themselves which relationships cause the driver's side wiper to effectively dwell at the outer limit of its arc while the passenger's side wiper traverses the driver's primary vision area in both outbound and inbound directions so that the primary vision area is double wiped on each tandem stroke of the wipers. Still another feature of this invention resides in the provision in the new and improved windshield wiper drive of linkage between the passenger's side crank arm and the drive link including a ground link pivotally supported on the vehicle and connected to the drive link for pivotal movement in an intermediate arc proportional to the linear stroke of the drive link and a connecting link between the ground link and the passenger's side crank arm operative to pivot the passenger's side crank arm through an angle proportional to the magnitude of the intermediate arc. These and other features of this invention will be readily apparent from the following specification and from the drawings wherein:

FIG. 1 is a two dimensional front view of a vehicle windshield and a windshield wiper system having a drive according to this invention;

FIG. 2 is an enlarged view of a portion of the windshield wiper drive according to this invention taken generally along the plane indicated by lines 2—2 in FIG. 1;

FIG. 3 is a two dimensional schematic representation of the windshield wiper drive according to this invention showing the elements thereof in positions corresponding to the inner positions of the wipers; and FIG. 4 is a similar to FIG. 3, but with the elements in positions corresponding to the outer positions of the wipers.

Referring now to FIG. 1 of the drawings, an automobile windshield 10 has an upper edge 12, a lower edge 14, a driver's side vertical edge 16, a passenger's side vertical edge 18, and an outer surface 20. The windshield 10 wraps partially around the vehicle body, not shown, in conventional fashion so that the lower edge 14 appears curved in FIG. 1 while the vertical edges 16 and 18 converge from the lower edge toward the upper edge 12. A windshield wiper system 22 having a drive according to this invention is disposed generally below the windshield.

As seen best in FIGS. 1 and 2, the drive for the windshield wiper system 22 includes a driver's side transmission 24 adapted for rigid attachment to a cowl panel 25, FIG. 2, below the lower edge 14 of the windshield. The transmission 24 defines an axis 26 generally perpendicular to the outer surface 20 of the windshield adjacent the driver's side edge 16. A shaft, not shown, supported on the transmission 24 for rotation on the axis 26 carries a driver's side crank arm 28 behind the cowl panel and a driver's side windshield wiper arm 30 in front of the cowl panel. A driver's side wiper blade 31 is attached to the distal end of the wiper arm 30. As described hereinafter, the angular relationship between the crank arm 28 and the wiper arm 30 is predetermined and fixed so that both the crank arm and the windshield wiper arm are rotatable as a unit about the axis 26.

The drive for the windshield wiper system 22 further includes a passenger's side transmission 32 disposed between the driver's side transmission 24 and the passenger's side edge 18 of the windshield. The transmission 32 includes a mounting plate 34 adapted for rigid attachment to the cowl panel below the windshield 10. The mounting plate 34 has a tower 36 defining an axis 38 parallel to the axis 26 and generally perpendicular to the windshield 10. A shaft 40 is supported in the tower 36 of the mounting plate for rotation on the axis 38 and has rigidly attached to an outboard end thereof forward of the cowl panel a passenger's side windshield wiper arm 42. A wiper blade 43 is attached to the distal end of wiper arm 42. An elongated drive plate 44 is rigidly attached generally at its mid-portion to the inboard end of the shaft 40 behind the cowl panel. As described hereinafter, the angular relationship between the drive plate and the passenger's side wiper arm 42 is predetermined and fixed so that the arm 42 and the drive plate are rotatable as a unit with the shaft 40 about the axis 38.

An operating link 46 is oriented generally transversely of the vehicle body below the windshield and has a driver's side end pivotally connected to the crank arm 28 at 48 and a passenger's side end pivotally connected to one end of the drive plate 44 at a ball stud 50 on the drive plate. Accordingly, the driver's side windshield wiper arm 30 and blade 31 and the passenger's side windshield wiper arm 42 and blade 43 pivot in tandem fashion, i.e., pivot in the same direction at the same time, about the axes 26 and 38, respectively.

With continued reference to FIGS. 1 and 2, a ground link 52 has one end attached to the mounting plate 34 for pivotal movement about a stationary axis 54. A ball stud 56 is rigidly attached to the ground link 52 at the end thereof opposite axis 54 and defines another pivot axis 58 parallel to the axis 54. A relatively short connecting link 60 is journaled at one end thereof on a shank portion of the ball stud 56 so that the connecting link is rotatable relative to the ground link about the axis 58. The other end of the connecting link 60 is pivotally connected to the drive plate 44 at a pivot connection 62 at the end of the drive plate opposite the ball stud 50.

A unidirectional electric motor 64, FIG. 1, is rigidly supported on the vehicle body generally adjacent the driver's side transmission 24 and includes an armature shaft, not shown, rotatable about a fixed axis 66, FIGS. 1, 3 and 4. A motor crank arm 68 is rigidly attached to the armature shaft for rotation as a unit therewith about the axis 66. A generally transversely oriented drive link 70 has a driver's side end pivotally connected to the distal end of motor crank arms 68 at 72 and a passenger's side end pivotally connected to the ball stud 56 attached to the ground link 52.

When the armature of the motor 64 and the motor crank arm 68 rotate about the axis 66 the drive link 70 linearly reciprocates transversely of the vehicle body in strokes corresponding to the diameter of a circular orbit 78 about the axis 66 traversed by the pivot connection 72. The ground link 52 and the connecting link 60 modify the linear stroke of the drive link 70 as it is applied to the drive plate 44 such that 180° of rotation of the motor crank arm 68 from a retracted position, FIG. 3, to an extended position, FIG. 4, produces approximately 135° of pivotal movement of the passenger's side wiper arm 42 and wiper blade 43 from an inner position 43', FIG. 3, to an outer position 43", FIG. 4. During pivotal movement of the passenger's side wiper arm 42 and wiper blade 43, the blade traverses an arc 80 across the outer surface 20 of the windshield bounded or limited at its ends by the inner and outer positions 43' and 43", respectively, of the wiper blade.

The drive plate 44 rotates with the passenger's side wiper arm 42 about axis 38 through the same included angle. The operating link 46 is driven laterally by the drive plate 44 and thus transfers the angular stroke of the drive plate to the driver's side crank arm 28 and to the driver's side wiper arm 30 and blade 31 in tandem fashion. In the same 180° of angular rotation of the motor crank arm 68 from the retracted position, FIG. 3, to the extended position, FIG. 4, the driver's side wiper arm 30 and wiper blade 31 rotate through an included angle of about 80° from an inner position 31', FIG. 3, adjacent the lower edge 14 of the windshield to an outer position 31", FIG. 4, adjacent the driver's side edge 16 of the windshield. The wiper blade 31 thus traverses on arc 92 on the outer surface 20 of the windshield bounded or limited at its ends by the inner and outer positions 31' and 31", respectively, of the wiper blade. In FIGS. 1 and 4, the arcs 80 and 92 have been illustrated at about the 135° and 80° included angles achieved in a working embodiment of the windshield wiper system according to the invention. Individual elements thereof, however, appear foreshortened in the two dimensional representation of the drawings.

The arc 80 traversed by the passenger's side wiper blade 43 is longer than the arc 92 traversed by the driver's side wiper blade 31 and overlaps the latter to the extent that during each outbound tandem stroke of the wiper blades an overlapped area 98 in the driver's primary field of vision receives a double wipe, first by the driver's side blade 31 and then by the passenger's side blade 43. The double wipe is repeated on the succeeding inbound tandem stroke of the blades but with the passenger's side blade 43 wiping the area 98 first followed by the driver's side blade 31.

The proper size relationship between the arcs 80 and 92 to achieve maximum wiping and synchronization of the wiper blades 31 and 43 to avoid interference in the area 98 are achieved by coordinating the lengths of the driver's side crank arm 28 and that portion of the drive plate 44 between the axis 38 and the ball stud 50 and by coordinating the relative angular positions of the drive plate and the driver's side crank arm. Of particular importance is the fact that the drive plate 44 achieves an almost horizontal attitude at the outer position 31" and 43" of the wiper blades 31 and 43, respectively, while the driver's side crank arm 28 is more nearly vertically oriented. This relationship assures that when the wiper blade 31 is near its outer position 31", the horizontal component of motion transferred by the operating link 46 to the driver's side crank arm 28 is small so that the corresponding angle traversed by the driver's side wiper arm 30 and wiper blades 31 is likewise small. The driver's side wiper blade 31 thus effectively dwells near its outer position thereby allowing passenger's side wiper blade 43 to double wipe the driver's primary vision area 98 without interference.

The embodiments of the invention in which an exclusive property or privilege is claimed are defined as follows:

1. In a wiper system for a vehicle windshield having a passenger's side and a driver's side and a driver's primary vision area, said wiper system including a first wiper blade supported on said vehicle for pivotal movement about a first axis below said driver's side of said windshield and a second wiper blade supported on said body for pivotal movement about a second axis below said windshield and to the passenger's side of said first axis, a drive for said wiper system comprising, a motor driven crank arm disposed as said body for unidirectional rotation, a transverse drive link below said windshield with one end pivotally connected to said motor driven crank arm so that said drive link linearly reciprocates through constant length strokes proportional to the length of said motor driven crank arm during rotation of the latter, an elongated drive plate connected to said second wiper blade and rotatable as a unit therewith about said second axis having a first end disposed on one side of said second axis and a second end disposed on the opposite side of said second axis from said first end, linkage means including a ground link pivotally connected to each of said vehicle and the other end of said drive link and a connecting link pivotally connected to each of said ground link and said drive plate first end operative to angularly oscillate said passenger's side wiper blade through an included angle proportional to the stroke of said drive link whereby said second wiper blade wipes a first arc on said windshield having an inner limit adjacent said windshield lower edge to the passenger's side of said primary vision area and an outer limit on the opposite side of said primary vision area from said inner limit, a driver's side crank arm connected to said first wiper blade and rotatable as a unit therewith about said first axis, and a transverse operating link having one end pivotally connected to said second end of said drive plate and the other end pivotally connected to said driver's side crank arm so that said operating link is reciprocated by said drive plate in linear strokes proportional to said included angle of said wiper blade, said operating link angularly oscillating said first wiper blade in tandem with said second wiper blade through an included angle proportional to the linear stroke of said operating link so that said first wiper blade wipes a second arc on said windshield having a inner limit adjacent said windshield lower edge to the passenger's side of said primary vision area and an outer limit adjacent said windshield driver's side edge on the opposite side of said primary vision area from said inner limit whereby said primary vision area receives a double wipe during each tandem stroke of said first and second wiper blades.

* * * * *